Figure 2:
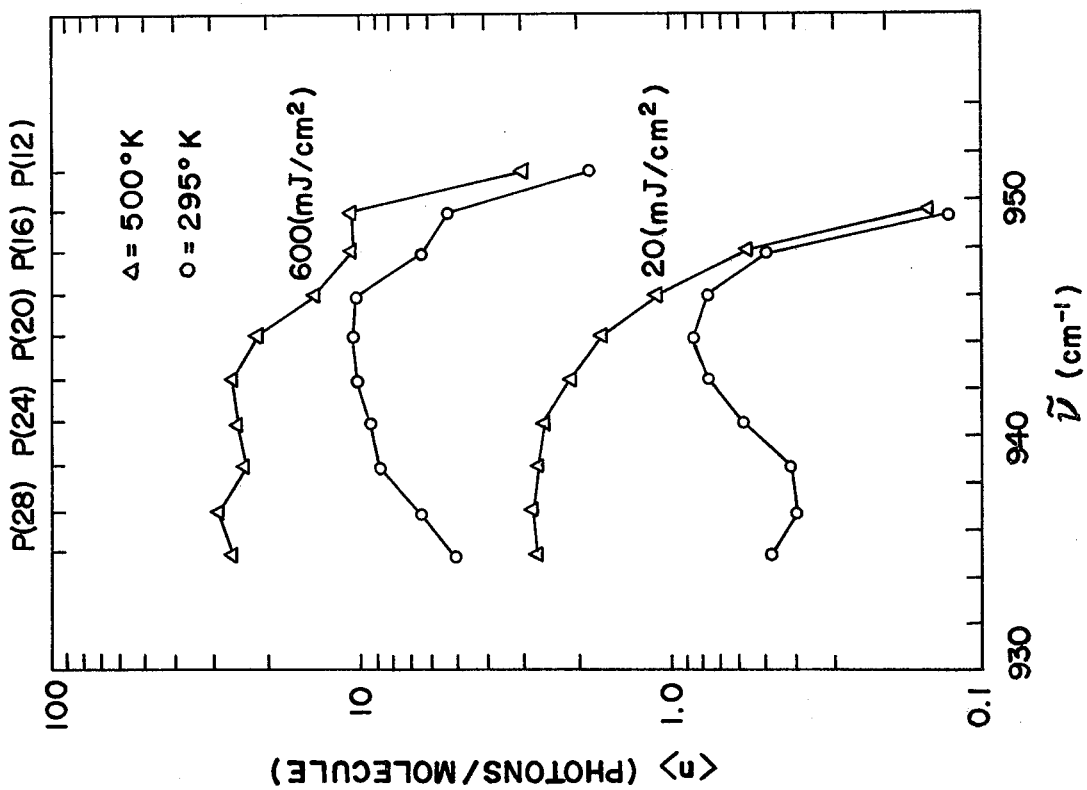

United States Patent [19]

Ham et al.

[11] 4,303,483

[45] Dec. 1, 1981

[54] LASER ISOTOPE SEPARATION AND GAS PURIFICATION BY MULTIPLE PHOTON ABSORPTION ENHANCED BY HEATING

[75] Inventors: David O. Ham; Wei-Shin Tsay, both of Rochester, N.Y.

[73] Assignee: The University of Rochester, Rochester, N.Y.

[21] Appl. No.: 5,407

[22] Filed: Jan. 22, 1979

[51] Int. Cl.$^3$ .............................................. B01D 59/00
[52] U.S. Cl. ........................ 204/157.1 R; 204/157.1 H
[58] Field of Search ................. 204/157.1 R, 157.1 H; 250/423 P; 55/1

[56] References Cited

U.S. PATENT DOCUMENTS 4,049,515 9/1977 Robinson et al. ............ 204/157.1 R
4,144,453 3/1979 Rigny ............................... 250/423 P

OTHER PUBLICATIONS

Robinson, C. P. et al., DOE Report #LA-UR-76-191, Feb. 1976.
Ambartsumyan, R. V. et al., "Separation of Sulfur Isotopes with Enrichment Coefficient > $10^3$ Through Action of $CO_2$ Laser Radiation on $SF_6$ Molecules," JETP Lett. 21(6): 171-172. Mar. 20, 1975.

Primary Examiner—Richard E. Schafer
Attorney, Agent, or Firm—Martin Lukacher

[57] ABSTRACT

The efficiencies of laser isotope separation processes based on multiple photon absorption from infrared laser pulses are enhanced thermally by raising the temperature of the gas upon which the laser beam is incident, thereby increasing the absorption and the isotopically selective excitation which enables isotopes in the gas to be separated. This same enhancement is applicable to processes for laser purification of gases which involve multiple photon absorption from infrared laser pulses.

14 Claims, 4 Drawing Figures

LASER ISOTOPE SEPARATION AND GAS PURIFICATION BY MULTIPLE PHOTON ABSORPTION ENHANCED BY HEATING

DESCRIPTION

The present invention relates to laser isotope separation and gas purification and particularly to the method for enhancing the efficiency of selective excitation by multiphoton absorption from infrared laser pulses.

Isotope separation by the use of laser energy has been the subject of much interest. Multiphoton processes for the selective excitation of isotopes using high power lasers has also been studied. A survey of the state of this technology is contained in *Optical Isotope Enrichment—A Scientific Overview*, by David O. Ham and Gerard P. Quigley, which appeared in the Proceedings of the Society of Photo-Optical Instrumentation Engineers, Vol. 61 (1975) Energy Conversion. Reference may be had also to D. O. Ham and M. Rothschild, *Optics Letters* 1, 28 (1977), and to the text *Chemical and Biochemical Applications of Lasers*, Vol. III, edited by C. B. Moore (Academic Press, New York, 1977) for recent work and procedures for carrying out multiphoton absorption of laser pulses for isotope separation and related photochemical applications. The application of multiple photon absorption to gas purification is described in the paper by R. V. Ambartsumyan et al., Sov. J. Quantum Electronics 7, 96 (1977).

The present invention provides improvements in the multiphoton absorption isotope separation and gas purification processes by increasing the efficiency of multiphoton absorption. The present invention provides a surprising enhancement of multiphoton absorption thermally, as by heating the gas consisting of the molecules which contain the isotopes to be separated or gaseous impurities to be removed. The molecules containing one isotope or the impurity molecules are then selectively excited and may then dissociate or be reacted with reactants which are not active with those molecules except when they are in the excited state. This enables the extraction of the selected isotope or impurity. The extraction of the selected isotope may, for example in the case of $SF_6$, be obtained by adding $H_2$ which gives mainly HF, isotopically enriched $SF_4$ products, and unreacted, isotopically enriched $SF_6$. These extraction steps are more fully discussed in the above cited references.

Isotope separation processes are improved, in accordance with this invention, by thermal enhancement for cases where the spectral absorption shifts between the isotopes to be separated are larger than the spectral shifts which are thermally induced. Though this is a desirable condition for isotope separation, it is not a necessary one. Isotope enrichment has been achieved for Se from $SeF_6$ (J. J. Tiee and C. Wittig, Appl. Phys. Lett. 32, 236 (1978) and Mo from $MoF_6$ (S. M. Freund and J. L. Lyman, Chem. Phys. Lett. 55, 435 (1978)), even though, for both cases, there are several isotopes which have absorption peaks within the width of the room temperature absorption profile. Since heating shifts the absorption spectrum for each isotope variant by nearly the same amount, thermal enhancement will improve efficiencies even for these cases. A table listing a small sample of molecules for which this process will apply is included as Table 1.

For gas purification applications, the relevant absorption spectra are those corresponding to different chemical species and therefore will not normally overlap. Also, since the specie to be removed will be present in small concentrations, enhancement of efficiencies of absorption is especially important. These two features increase the importance of thermally enhanced, multiple photon absorption in purification processes. Purification of $AsCl_3$ by selective multiple photon dissociation of $CCl_4$ and $C_2H_2Cl_2$ impurities has been accomplished (Ambartsumyan et al., cited above).

TABLE 1

| Absorption Frequencies of Isotope Variants of Some Molecules | | |
|---|---|---|
| Molecule | Isotopes | Mode (Frequencies ($cm^{-1}$)) |
| $BCl_3$ | $^{10}B, ^{11}B$ | $\nu_3$(994, 985) |
| $CF_2Cl_2$ | $^{12}C, ^{13}C$ | $\nu_8$(944.2, 914) |
| $NH_3$ | $^{14}N, ^{15}N$ | $\nu_2$(950, 926) |
| $SiF_4$ | $^{28}Si, ^{29}Si, ^{30}Si$ | $\nu_3$(1031, 1023, 1014) |
| $SF_6$ | $^{32}S, ^{33}S, ^{34}S, ^{36}S$ | $\nu_3$(947, 939, 930, 914) |
| $TiCl_4$ | $^{41}Ti, ^{42}Ti, ^{48}Ti, ^{49}Ti, ^{50}Ti$ | $\nu_3$(506.1, 502.4, 498.5, 494.6, 490.9) |
| $SeF_6$ | Se(171, 172, 173, 175, 177) | $\nu_3 \simeq 780$ $cm^{-1}$ shifts $\simeq 1.6$ $cm^{-1}$/mass unit |
| $MoF_6$ | Mo(92, 94, 95, 96, 97, 98, 100) | $\nu_3 + \nu_5 \simeq 1050$ shifts $\simeq 1.0$ $cm^{-1}$/mass unit |

The invention will be applicable to purification of $AsCl_3$ and to other molecules that can exist in the gas phase.

The principal object of this invention is therefore to provide improved methods for enhancing laser isotope separation efficiencies and gas purification efficiencies by multiple photon absorption.

The foregoing and other objects, advantages and features of the invention as well as the best mode of carrying out the invention will be more apparent from the ensuing description and the accompanying drawings which consider the particular case of absorption by $SF_6$.

Figure 1:
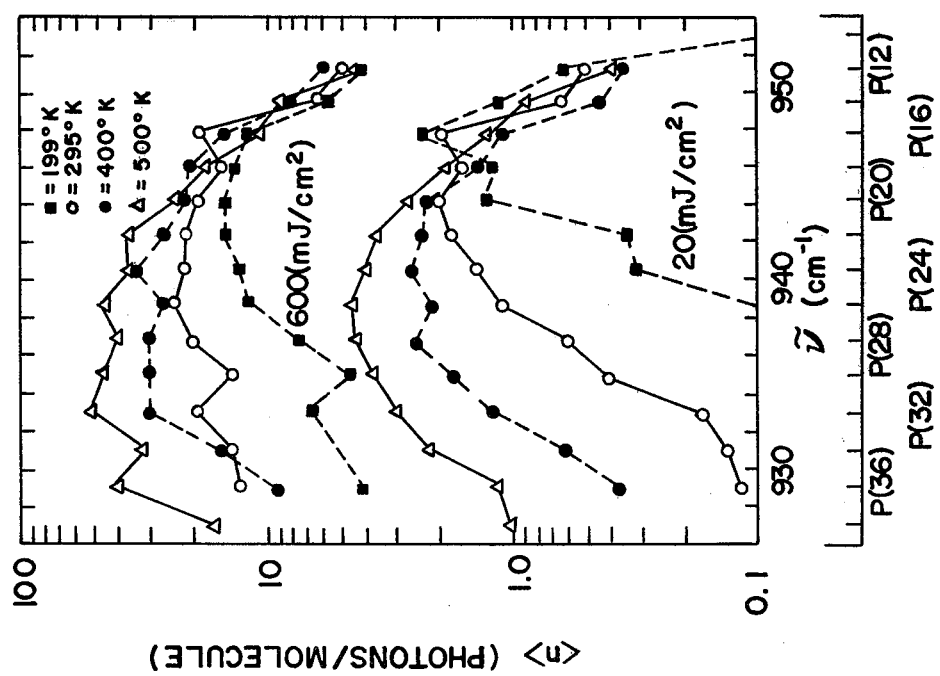

FIG. 1 of the drawings is a plot of the average number of photons per molecule, $<n>$, absorbed from relatively long laser pulses (120 ns full width half maximum FWHM) by $SF_6$ at 0.5 torr for four different temperatures, 199 K., 295 K., 400 K., and 500 K., and for various $CO_2$ laser lines (P(12) to P(30)) of the $00°1$–$10°0$ band versus the laser frequency $\nu(cm^{-1})$. The upper group of points on the plot are for a fluence of 600 $mJ/cm^2$ and the lower group of points are for a fluence of 20 $mJ/cm^2$. The lines connecting the points are shown for clarity only.

FIG. 2 of the drawings is a plot similar to FIG. 1 showing the average number of photons $<n>$ absorbed from short pulses (80 ns FWHM by $SF_6$ at 0.5 torr) for two different temperatures (295 K. and 500 K.). The upper points are for a fluence of 600 $mJ/cm^2$ and the lower points for a fluence of 20 $mJ/cm^2$. The lines connecting the points are shown for clarity only.

Figure 3:
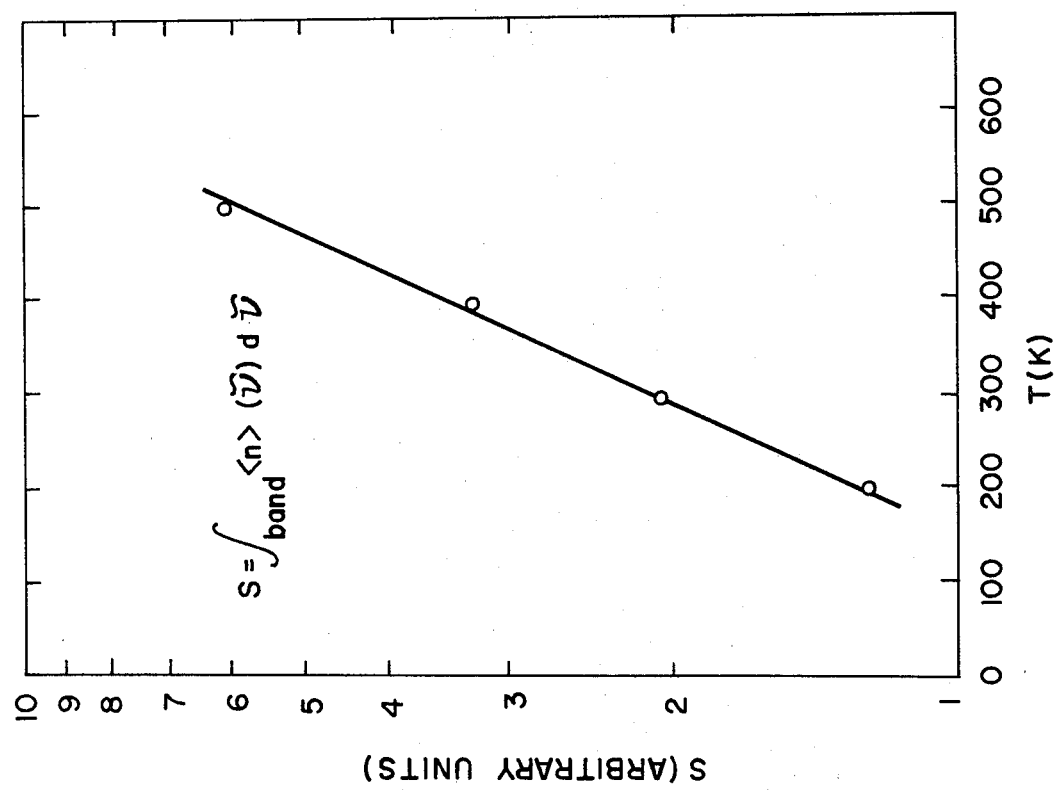

FIG. 3 of the drawings is a semi-log plot of the integrated band strength, S, for the $\nu_3$ band of $SF_6$ at a fluence of 20 $mJ/cm^2$ versus temperature.

Figure 4:
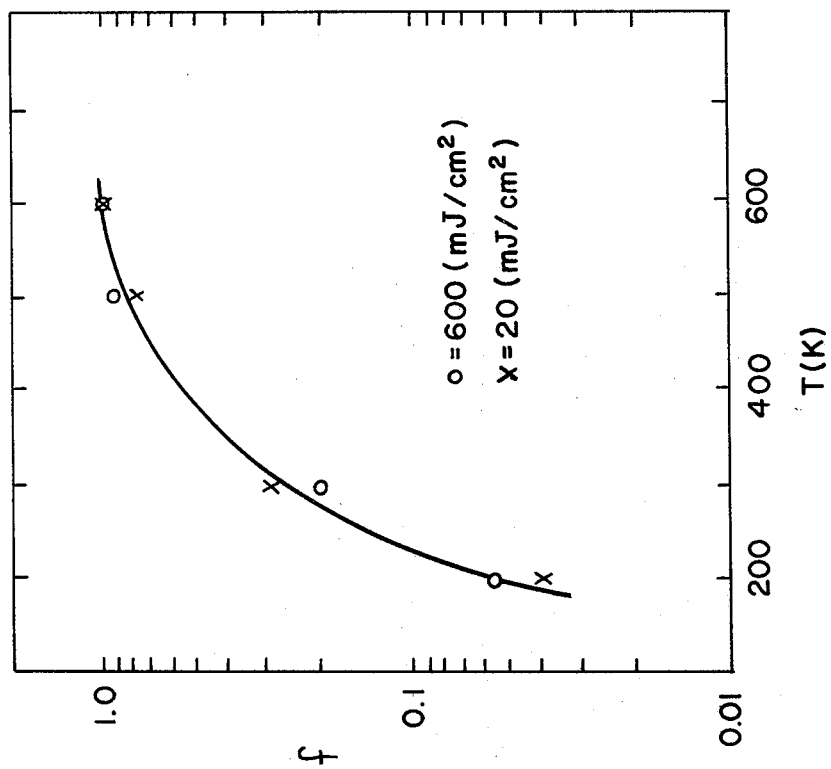

FIG. 4 of the drawings is a semi-log plot showing the temperature dependence of the fraction, f, of $SF_6$ molecules in the irradiated volume of gas, consisting of $SF_6$, which absorbs energy from the laser pulse. The plot contains data for the short pulse and the P(28) laser line for both the 600 $mJ/cm^2$ and 20 $mJ/cm^2$ fluences.

Referring to the Figures, it will be seen that the data show examples of the thermal enhancement of multiphoton absorption for laser isotope separation which may be carried out at different laser frequencies, at different temperatures, and with different fluences and widths of the laser pulse. For sulfur using $SF_6$, thermal enhancement of separation efficiency may be preferably carried out with short pulses (80 ns FWHM in the example) and low fluences (20 mJ/cm² in this example) with temperature of the gas at about 500 K. The optimum temperature, pulse width, and fluence will depend upon the molecule which is to be purified or dissociated. The wavelength of the laser pulses depends upon the isotope to be separated. For example, for $SF_6$ the P(28) line may be used by tuning the $CO_2$ laser to the wavelength of that line. Other wavelengths may be used for other isotopes. For example, for $SeF_6$, to select selenium Se isotopes, a laser line at approximately 780 cm$^{-1}$ may be used. This line may be obtained from an ammonia ($NH_3$) laser.

The data shown in the Figures were obtained using a $CO_2$ laser with an intracavity variable diaphragm set such that the output fluence was optimized. The laser is tuned by means of a pivotable diffraction grating. Particularly, the laser was a model 103 TEA $CO_2$ laser manufactured by Lumonics of Ottawa, Canada. Data in FIG. 1 were obtained using a long pulse of approximately 120 ns FWHM. This pulse was generated by the laser with a fill of He:$CO_2$:$N_2$ in proportion 8:2:0.8. For the short pulse data shown in FIG. 2, the gas fill did not contain $N_2$ and the pulse had a width of 80 ns FWHM.

The fluence was adjusted by means of a Ge beam splitter and/or plastic sheets in the beam path. The fluences varied from 5.0 mJ/cm² to 1.0 J/cm². The long pulse had the highest fluence of about 800 mJ/cm². The beam size determined by burn paper patterns and scanning the beam was 0.33 cm² beam area for the long pulse. A beam reducer in the form of a reverse telescope having two lenses with focal lengths of +15 cm and −5 cm, was used to reduce the short pulse beam area to approximately 0.06 cm². The gas, $SF_6$, was contained in a gas chamber or cell made of aluminum which was cylindrical in form. The diameter of the gas chamber was 2.54 cm. The cell was closed with NaCl windows. The laser and beam reducer and attenuator were located on one side of the cell and an energy detector, namely a Model ED-200 pyroelectric energy meter manufactured by Gen-tech of Quebec, Canada was located on the opposite side of the cell. As shown in the Figures the laser operated in the P branch and the (00°1–10°0) transition was used. In the case of the long pulse, the P(10) to P(38) lines were used as shown in FIG. 1. For the short pulse, without $N_2$ in the fill, the laser only provided wavelengths of its P(12) to P(30) lines.

The temperature of the gas was controlled at the cell. The cell was initially cooled to 199±1 K. with a dry ice-propanol mixture. A heating tape around the cell heated the cell to higher temperatures up to 600 K. and including the temperatures 199 K., 295 K., 400 K., and 500 K. as shown in FIG. 1. In the case of the 199 K. temperature, two jets of dry $N_2$ gas were directed to the surfaces of both NaCl windows to prevent frost condensation.

The pressure of the $SF_6$ was maintained at 0.5 torr, determined by a gauge. The cell was first evacuated to a pressure of $10^{-4}$ to $10^{-5}$ torr by a diffusion pump before filling with gas. During a set of measurements, pressure did not change by more than 10%, which is within the fluctuations intrinsic to the laser and the detector. For each temperature, pulse length, frequency and fluence shown in FIGS. 1 and 2, the average and standard deviation of the energies detected for 15 pulses transmitted through the evacuated cell were measured and recorded. Similarly measured and recorded were the same quantities for 30 pulses with the cell filled with 0.5 torr $SF_6$. The measurements for the evacuated cell were repeated after each test with the gas filled cell after pumping out the gas. Fresh gas was introduced for each sequence of measurements, the gas being $SF_6$, of minimum purity 99%.

The average number of photons absorbed per molecule $<n>$ of the gas in the beam path was calculated from $$<n> = \frac{(\Phi_{vac} - \Phi_{0.5\ torr})[mJ/cm^2]}{d\left[\frac{molecule}{cm^3 \cdot torr}\right] \times 0.5\ [torr] \times 6.35\ [cm] \times h\nu[mJ/photon]}$$

In this equation, $\Phi_{vac}$, is the average fluence which illuminates the molecules in the cell. $\Phi_{vac}$ is the average of the two vacuum readings taken before and after the tests with the cell filled with 0.5 torr $SF_6$. $\Phi_{0.5\ torr}$ is the average fluence measured by the detector with the cell filled with gas. d is the density of $SF_6$ at the particular temperature at which the measurement was made. The ideal gas formula was used to calculate d for different temperatures. $h\nu$ is the energy of one photon of the particular wavelength.

FIG. 1 shows the enhancement of multiphoton absorption by heating. This thermal enhancement is especially large at long wave lengths although not especially significant for the P(16) laser line which coincides with the v=0–1 Q branch of the $\nu_3$ modes of $SF_6$. The data show that the absorption due to the thermal enhancement dominate all other effects even at 300 K. Increasing the temperature has a greater effect at low excitation levels (20 mJ/cm²) than at the high energy levels (600 mJ/cm²). At the high energy levels (600 mJ/cm²), absorptions of more than 30 photons per molecule result for several laser lines. This is somewhat higher than the energy for dissociating one F from $SF_6$, which corresponds to 34 photons per molecule. It is believed that this additional absorption is attributable to absorption by dissociation fragments of $SF_6$ (see S. W. Benson, *Thermochemical Kinetics*, Second Edition, John Wiley & Sons, 1976, Tables A.11 and A.12; J. L. Lyman, *J. Chem. Phys.*, 67, 1868 (1977); E. R. Grant et al., *Chem. Phys. Lett.* 52, 595 (1977)). These large absorptions do not occur with the short pulses (see FIG. 2). The increase of $<n>$ with increasing temperature is slightly larger with short pulses than long pulses (see FIG. 2). This demonstrates that the thermal enhancement effect is not due to collisions, and therefore does not compete with collisional isotope scrambling. The short pulse data which were taken at a temperature of 600 K. are the same over the entire fluence range as those at 500 K. This shows a temperature saturation effect occuring at about 500 K. Above 600 mJ/cm² this temperature saturation occurs for values of $<n>$ in the low 30's, which shows that each molecule is absorbing up to about its dissociation limit of 34 photons under these conditions.

The surprising result of enhanced multiple photon absorption with temperature is shown in FIGS. 3 and 4. FIG. 4 shows the graphically integrated band strength $$S = \int_{band} <n> \tilde{(v)} d\tilde{v}$$

As shown in FIG. 3, this band strength S, increases exponentially with T at all fluences in the range 5 to 600 mJ/cm². S is essentially constant with temperature in low intensity spectra (see H. Brunet, IEEE J. Quantum Elect. QE-6, 678 (1970)); A. V. Nowak and J. L. Lyman, J. Quant. Spectrosc. Radiat. Transfer 15, 945 (1975); and K. Fox and W. B. Person, J. Chem. Phys. 64, 5218 (1978)). Accordingly, the results obtained in multiphoton absorption in accordance with the invention are most surprising.

While the physical basis for these results is not fully understood and is not explained by any available theoretical treatments, it may be that it results from an interaction that is insignificant at low intensities of incident energy but which enhances the effective transition moment of the molecular species. It is evident that the enhancement of multiphoton absorption by increasing temperature is a singular effect which increases the absorption of photons much more than does the laser excitation energy itself. By comparing the multiphoton absorptions subsequent to the deposition of equal excitation energies in the vibrational mode by either heating or laser excitation, it can be shown that the laser excitation does not result in a thermal distribution of energy among all of the vibrational modes up to excitations of at least 3 photons absorbed.

The fraction, f, of absorbing molecules in the irradiated volume in the cell is plotted as a function of temperature and fluence in FIG. 4. These data follow from the data such as those shown in FIG. 2 and from the observation that saturation occurs between 500 K. and 600 K. because all molecules are absorbing. The enhancement of multiphoton absorption by heating is much larger than can be explained by any known resonances.

Accordingly, the efficiency of laser isotope separation and gas purification processes may be enhanced in accordance with the invention by thermal means, namely heating the gas upon which the laser pulses are incident. This enables lower fluences (viz., lower laser energy levels) to be used, thus making laser isotopes separation of greater practical advantage compared to other isotope separation processes.

We claim:

1. In a method of separating a desired isotope or impurity from a gaseous mixture containing the isotope or impurity wherein the mixture is irradiated with a laser which selectively excites the desired isotope or impurity by means of multiphoton absorption of the energy of said laser, the improvement which comprises the step of enhancing multiphoton absorption by heating the gaseous mixture, said isotope or impurity possessing spectral absorption features sufficiently distinct from the features of the remainder of the mixture to allow selective excitation when heated.

2. The invention as set forth in claim 1 wherein said thermal enhancing step is carried out while the laser energy is incident upon the gas.

3. The invention as set forth in claim 1 wherein said heating is carried out to heat the gas above room temperature.

4. The invention as set forth in claim 1 wherein said heating is carried out to heat the gas to about 500 K.

5. The invention as set forth in claim 1 wherein said laser energy is applied to said gas in the form of pulses.

6. The invention as set forth in claim 5 wherein said pulses have a fluence in the range of 5 mJ/cm²-1 J/cm².

7. The invention as set forth in claim 6 wherein said pulses are short pulses less than 80 ns in width.

8. The invention as set forth in claim 1 wherein said gas consists of molecules selected from $MoF_6$, $SeF_6$, and $SF_6$.

9. The method for separation of isotopes or impurities present in the molecules of a gas which have a spectral absorption shift larger than their spectral thermal shift and are selectively excitable when heated which comprises the steps of causing said isotopes or impurities to absorb multiple photons to selectively raise said isotopes or impurities to an excited energy state, heating said gas to enhance the multiple photon absorption by said isotopes or impurities while they are being caused to absorb multiple photons, and extracting said excited isotopes.

10. The invention as set forth in claim 9 wherein said causing step is carried out by irradiating said molecules with laser energy of wavelengths in the spectral absorption band of said isotopes or impurities.

11. The invention as set forth in claim 10 wherein said laser energy is in the form of pulses.

12. The invention as set forth in claim 11 where the fluence of said energy incident upon said gas is in the range 5.0 mJ/cm² to 1.0 J/cm².

13. The invention as set forth in claim 9 wherein said heating step is carried out by heating said gas to raise its temperature from 199 K. to 600 K.

14. The invention as set forth in claim 9 wherein said gas consists of molecules selected from the molecules listed in $MoF_6$, $SeF_6$, and $SF_6$.

* * * * *